UNITED STATES PATENT OFFICE.

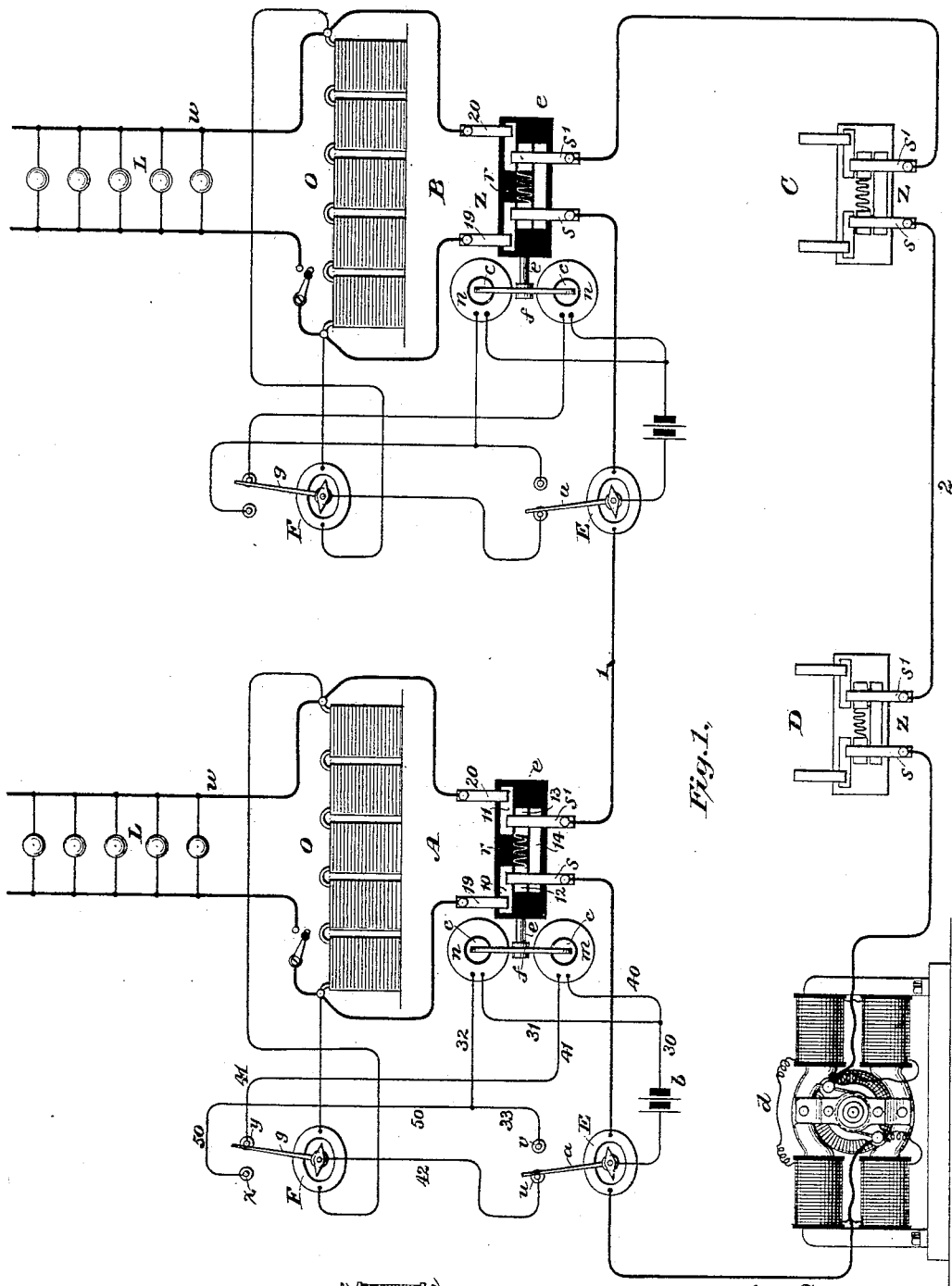

WILLIAM W. GRISCOM, OF HAVERFORD COLLEGE, PENNSYLVANIA.

DISTRIBUTION OF ELECTRICITY BY SECONDARY BATTERIES.

SPECIFICATION forming part of Letters Patent No. 393,470, dated November 27, 1888.

Application filed July 14, 1888. Serial No. 279,921. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in Distribution of Electricity by Secondary Batteries, of which the following is a specification.

My invention is an improvement in the distribution of electricity by secondary batteries.

I arrange a dynamo-machine at a central station, and at one or more sub stations electrically connected with the central station I arrange secondary batteries, a working-circuit for each battery, and means for automatically including and excluding the battery with respect to the charging-circuit. The automatic means referred to consist of two co-operating magnets, one located in the charging-circuit and one in a circuit connected to opposite terminals of the battery and indicating the variations in electro-motive force thereof. These two magnets control a local circuit containing an electro-magnet, which in turn operates an automatic switch of improved construction. This switch is so arranged that in passing the battery in and out of the charging-circuit an artificial resistance is connected in parallel with it, so that sparking is avoided.

The accompanying drawings illustrate my invention.

Figure 1 is a view of the system complete. Fig. 2 is a detail of the switch-operating magnet.

$d$ is a dynamo located at the central station.

A B C D are sub-stations electrically connected to dynamo $d$ by a main circuit, 1 2. The details at stations A and B alone are shown, as all are substantially alike.

At sub-station A there is a secondary battery, O, having a working-circuit, $w$, feeding lamps L. This battery I automatically introduce and withdraw with respect to main circuit 1 2 by the operation of two electromagnets, one operated by variations in the electro-motive force of the battery and the other by the presence or absence of current in the main circuit.

F is a polarized electro-magnet of high resistance connected to opposite terminals of secondary battery O.

E is a polarized electro-magnet located in circuit 1 and operated to one effect by the presence of a charging-current of proper polarity in said circuit and to the opposite effect by the absence of such current. These magnets co-operate to control an electro-magnetic switch in a local circuit.

Z is the switch, having a base consisting of a section of insulating material, its surface being in the form of an arc of a circle. Upon the surface of this base are placed two conducting-contacts, 10 and 11, near the ends of the said insulating-base. Nearer the center are placed two other insulated contacts, 12 13, united through an artificial resistance, $r$, in amount forming a substantial equivalent to the battery. A third strip, 14, of conducting material is placed parallel to the pair last named.

19 and 20 are two spring-contacts forming the terminals of a circuit including the battery. These strips make contact with the section of insulating material near the ends thereof. They therefore make electrical contact with the insulated contacts 10 11, but not with the others. There are two other spring-contacts, $s\ s'$, forming opposite terminals of the divided charging-conductor 1. These are placed in position to contact with any of the insulated contacts, according to the position of the switch. The spring-contact strips $s\ s'$ are so shaped and arranged that in passing from one pair of contacts to another they lap and temporarily join both contacts, the ones from which they pass and the ones to which they pass.

The automatic operation of the switch Z is controlled by two electro-magnets, $m$ and $n$, in a local circuit, which in turn are controlled by the co operation of the polarized electro-magnets E and F.

The switch Z is arranged to oscillate upon a rod or arbor, $e$, placed in suitable bearings. Upon one end is fixed a cross-bar, $f$. The two magnets $m$ and $n$ are solenoids, having armature-cores $c$, respectively, fixed to opposite ends of the cross-bar $f$.

$b$ is a local battery operating three different local circuits. In the first circuit one terminal of $b$ is connected to armature $a$ of magnet E. The other terminal of battery $b$ is connected *via* wires 30 31, coil of magnet $n$, wires 32 33 to contact-stop $v$ of magnet E. The second circuit is from battery $b$ *via* wires 30 40, coil of magnet m, wire 41, contact-stop y, and armature g of magnet F, wire 42 to contact u, and armature a of magnet E. The third circuit is via elements b, 30 31, n, 32 50, x, g, 42, u, a. These three circuits are called into operation in three different conditions of the battery and charging-circuit jointly. The first circuit is operated when there is no current in the charging-circuit; the second, when there is current flowing in the charging-circuit and the battery is not fully charged; the third circuit when current is flowing in the charging-circuit and the battery is charged to a point at or near its maximum capacity.

The operation of the apparatus may be described as follows: As shown in the drawings, current is flowing in the charging-circuit and the battery is not fully charged. It is therefore by the operation of the switch placed in the charging-circuit. Magnet E in the charging-circuit carries its armature a against the contact u. The electro-motive force of the battery O has dropped so low that armature g of magnet F takes up its position against its stop y. Circuit is therefore via b, 30 40, m, 41, y, g, 42, u, a. Magnet m draws in its core c, pulls down its end of bar f, and tilts the switch Z into the position shown. The terminals of the charging-circuit s s' and the spring-strips 19 20, connected to the terminals of the battery, rest upon the same strips 10 11. Battery O is therefore included in the charging-circuit 1 2. If, now, for any reason current in the charging-circuit fails, armature a of magnet E will immediately take up its position in contact with the stop v. Circuit will then be formed via b, 30 31, 32 33, n, and a. Magnet n attracts its core c, bar f of switch Z is drawn down toward n, and the position of switch Z is reversed. In passing from one position to the other, switch Z breaks contact between 10 and 19, 11 and 20. Strips s s' first connect resistance r in parallel with battery b by uniting contacts 10 and 12, 11 and 13. Resistance r is then included in the line s s', resting on 12 and 13, finally passing to strip 14. By this means sparking is prevented, the change in the course of the current is gradually made, and no shock is given the battery. If, while the local circuit is as first described, the electro-motive force of the battery rises to a point indicating full charge, the armature g of magnet F passes over to contact with its stop x. Circuit is then via b, 30 31, 32 50, x, g, 42, u, a, and the switch Z is carried into the position last described with the same result, the switch Z operating in the same manner. When there is current flowing in the charging-circuit and the electro-motive force of battery O falls to a predetermined point, the local circuit operates, as already described, but the switch Z first introduces resistance r into the charging-circuit, strips s s' resting on contacts 12 and 13. The battery and resistance are then introduced in parallel, strips s s' resting on 10 and 12, 11 and 13, respectively. Lastly, the contacts s s' separate from 12 and 13, leaving the battery alone in the charging-circuit. It will thus be seen that the battery is introduced into the charging-circuit when the current is flowing in said circuit and the battery is discharged, and that immediately the charging-current fails or the battery becomes charged the battery is removed from the charging-circuit; that these changes are produced automatically and through the medium of a switch arranged to guard against sparking and against a shock to either battery or charging-circuit.

What I claim, and desire to secure by Letters Patent, is—

1. The combination of a dynamo-electric machine, a secondary battery, a charging-circuit, an electro-magnetic switch or circuit-changer for varying the position of said battery with respect to the charging-circuit, consisting of a pair of contacts forming the terminals of the divided charging-circuit, a pair of contacts forming the terminals of the battery, and a contact for uniting the first-named pair of contacts, a local circuit for operating said switch, and an electro-magnet in the charging-circuit controlling said local circuit, substantially as described.

2. The combination of a dynamo electric machine, a secondary battery, a charging-circuit, an electro-magnetic switch or circuit-changer for changing the position of said battery with respect to said charging-circuit, and an electro-magnet in circuit with the battery operated by variations in the condition thereof to control said local circuit.

3. The combination of a dynamo-electric machine, a secondary battery, a charging-circuit, an electro-magnetic switch or circuit-changer for changing the position of said battery with respect to the charging-circuit, a local circuit for operating said circuit-changer, an electro-magnet in the charging-circuit, and an electro-magnet in circuit with the battery, the two last-named magnets co-operating to control the said local circuit.

4. The combination of a charging-circuit, a secondary battery to be charged therefrom, and a switch or circuit-changer for varying the position of said battery with respect to said circuit, consisting of two pairs of fixed contacts, a pair of movable contacts common to both fixed contacts, a second pair of movable contacts connected together through an artificial resistance, and a single movable contact for electrically uniting one of said pairs of fixed contacts.

5. The combination of a charging-circuit, a secondary battery, and a switch or circuit-changer consisting of (first) a pair of contacts forming the terminals of the divided charging-circuit, (second) a pair of contacts forming the terminals of the secondary battery, (third) a pair of contacts forming the terminals of an artificial resistance, (fourth) a single contact for uniting the terminals of the charging-circuit, and means for electrically uniting the first and second pairs of contacts with each other and with the third pair of contacts, substantially as described.

6. The combination of a charging-circuit, a secondary battery, and a switch or circuit-changer, consisting of (first) a pair of contacts forming the terminals of the divided charging-circuit, (second) a pair of contacts forming the terminals of the secondary battery, (third) a pair of contacts forming the terminals of an artificial resistance, (fourth) a single contact for uniting the terminals of the charging-circuit, and means for electrically uniting any two of said pairs of contacts by a continuous movement, substantially as described.

7. The combination of a charging-circuit, a secondary battery to be charged thereby, and a switch or circuit-changer, Z, having two line-contacts, two battery-contacts, and the movable contacts 10, 11, 12, 13, and 14.

8. The combination of a charging-circuit, a secondary battery to be charged thereby, the switch or circuit-changer Z, operated by magnets $m$ and $n$, a magnet in the charging-circuit, a magnet connected with the battery, and a local circuit controlled by the two last-named magnets to operate the two first-named magnets.

Signed at the city of New York, in the county of New York and State of New York, this 24th day of October, A. D. 1888.

WILLIAM W. GRISCOM.

Witnesses:
DANIEL E. DELAVAN,
WM. B. VANSIZE.